Patented Nov. 7, 1933

1,934,324

UNITED STATES PATENT OFFICE 1,934,324

PREPARATION OF VINYL CHLORIDE

Granville A. Perkins, South Charleston, W. Va., assignor to Carbide and Carbon Chemicals Corporation, a corporation of New York No Drawing. Application April 10, 1931
Serial No. 529,310

3 Claims. (Cl. 260—162)

The invention is a process for the preparation of vinyl chloride ($CH_2=CHCl$) from acetylene and hydrogen chloride. According to the present invention acetylene is caused to react with hydrogen chloride in aqueous solution in the presence of a catalyst and under conditions which favor the formation of vinyl chloride and which tend to minimize the formation of other substances. In general, the process comprises passing acetylene gas through an aqueous solution containing free dissolved hydrogen chloride and a catalyst comprising a soluble cuprous compound. Vinyl chloride is formed, and passes off in the gaseous state together with any excess acetylene. The vinyl chloride may be isolated by physical fractionating methods.

The advantages and economy of my new process will be apparent and the following specific examples are illustrative of my invention.

I. A solution was prepared containing 125 parts by weight of hydrogen chloride, 250 parts by weight of calcium chloride and 250 parts by weight of cuprous chloride, all dissolved in 600 parts by weight of water. This solution was placed in a glass cylinder arranged in a vertical position, and acetylene gas was admitted at the lower end of the cylinder by means of a filtros diffuser. The original solution was dark in color, due to the presence of cupric salts present as impurities in the cuprous chloride, but after acetylene had been passed through the solution for a few hours it became light green in color, and was ready for use. The catalytic solution was maintained at 20° C. and about 0.8 liters per hour of acetylene for each kilogram of the solution were passed through the solution. The issuing gases contained vinyl chloride and excess acetylene. The yield of vinyl chloride, as determined by condensation and fractional distillation, was equivalent to about a 26% conversion of acetylene to vinyl chloride in each passage of the acetylene. The vinyl chloride may be also conveniently isolated from the issuing gases by fractional distillation in the presence of an organic solvent, such as toluene or ethylene dichloride.

II. Hydrogen chloride gas was passed into the catalytic solution remaining after the reaction described in Example I until the total hydrogen chloride content was 150 parts by weight. The solution was heated to 65° C. and acetylene was passed through the solution at the rate of 2.4 liters per hour for each kilogram of the solution. The issuing gases contained vinyl chloride, excess acetylene, and traces of higher boiling substances, including acetaldehyde. The yield of vinyl chloride was equivalent to about a 69% conversion of acetylene to vinyl chloride in each passage of the acetylene. A reflux condenser was arranged above the reaction cylinder and by this means practically all of the moisture and free acid in the issuing gases was returned to the solution. When the process is operated under these conditions hydrogen chloride gas is admitted to the solution intermittently or continuously to replace the quantity which is consumed in the process.

The specific conditions set forth may be varied over a considerable range, the temperature may be raised to the boiling point of the solution if sufficient provision is made for refluxing the aqeous vapors. The pressure may be varied, but if the pressure is increased, special precautions, such as the use of diluents or the provision of capillary spaces, must be taken to avoid the possibility of explosion of the acetylene. Also, the concentration of free hydrogen chloride in the solution may be varied, but the formation of vinyl chloride decreases as the concentration of free hydrogen chloride is decreased.

In the examples described calcium chloride is present in the solution in addition to the cuprous salt. This is for the purpose of increasing the solubility of the cuprous salt which probably exists in the solution as a complex compound, such as chlorocuprous acid or calcium chlorocuprite. Other soluble chloride salts, for instance, ammonium, sodium, or potassium chloride, may replace the calcium chloride. In general, ammonium or substituted ammonium chloride, alkali metal chlorides and alkaline earth metal chlorides are suitable. Also, the cuprous chloride may be replaced by any substance or combination of substances, including some form of copper, which with hydrochloric acid will give solutions equivalent to those formed from cuprous chloride and hydrochloric acid. For example, cuprous oxide, metallic copper and cupric oxide, or metallic copper and chlorine may be used.

I claim:

1. A process for preparing vinyl chloride which comprises passing acetylene gas through an aqueous solution containing free dissolved hydrogen chloride and a catalyst, whereby vinyl chloride is formed by the reaction of the acetylene and the hydrogen chloride, and isolating the vinyl chloride from the issuing gaseous mixture, said catalyst essentially comprising cuprous chloride and another soluble chloride of the group consisting of alkali metals and alkaline earth metals.

2. A process for preparing vinyl chloride which comprises passing acetylene gas through an aqueous solution containing free dissolved hydrogen chloride and a catalyst, whereby vinyl chloride is formed by the reaction of the acetylene and the hydrogen chloride, supplying additional hydrogen chloride to the solution, and isolating the vinyl chloride from the issuing gaseous mixture, said catalyst essentially comprising a soluble cuprous compound and another soluble chloride of the group consisting of alkali metals and alkaline earth metals.

3. A process for preparing vinyl chloride which comprises passing acetylene gas through an aqueous solution maintained at about 65° C. and containing about 12% by weight of free dissolved hydrogen chloride and about 40% by weight of a catalyst, whereby vinyl chloride is formed by the reaction of the acetylene and the hydrogen chloride, supplying additional hydrogen chloride to the solution to maintain its hydrogen chloride content substantially constant and isolating the vinyl chloride from the issuing gaseous mixture, said catalyst essentially comprising approximately equal proportions of cuprous chloride and calcium chloride.

GRANVILLE A. PERKINS.